Z. RIDDLE & N. ASHBAUGH.
RULE HOLDER.
APPLICATION FILED APR. 24, 1914.
1,125,718.
Patented Jan. 19, 1915.
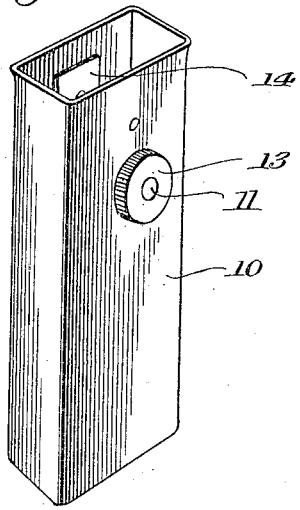
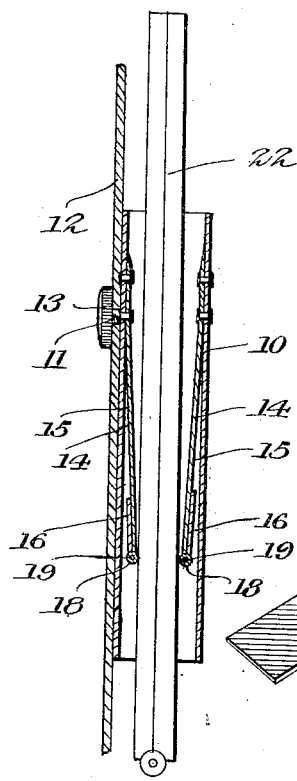
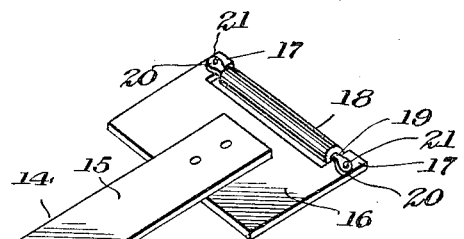
Witnesses
Roy D. Spaulding.
H. H. Hotter
Inventors
Zala Riddle
Nowal Ashbaugh
By Victor J. Evans
Attorney

UNITED STATES PATENT OFFICE.

ZALA RIDDLE AND NOWAL ASHBAUGH, OF WEED, CALIFORNIA.

RULE-HOLDER.

1,125,718.  Specification of Letters Patent.  Patented Jan. 19, 1915.

Application filed April 24, 1914. Serial No. 834,209.

*To all whom it may concern:*

Be it known that we, ZALA RIDDLE and NOWAL ASHBAUGH, citizens of the United States, residing at Weed, in the county of Siskiyou and State of California, have invented new and useful Improvements in Rule-Holders, of which the following is a specification.

An object of the invention is to provide a simple and effective device which can be readily attached to a garment and which will support or carry a pocket rule or the like.

The invention contemplates, among other features, the provision of a casing which can be readily attached to a garment and which is adapted to receive and hold the usual pocket rule ordinarily used by carpenters, mechanics, plumbers and the like, the holder being formed so that when the rule is held therein the figures of graduation on the rule as well as the edges thereof will not be marred, scratched or mutilated by the means contained in the casing for holding the rule against displacement.

In the further disclosure of the invention reference is to be had to the accompanying drawings, constituting a part of this specification, in which similar characters of reference denote corresponding parts in all the views, and in which:

Figure 1 is a perspective view of the rule holder; Fig. 2 is a vertical sectional view taken through the same and showing the manner of applying the rule holder to a garment; and Fig. 3 is a perspective view of one of the clips.

Referring more particularly to the views, we provide a casing 10 preferably made of metal and having both ends thereof open, said casing being of substantially rectangular construction in cross section and preferably having a threaded pin 11 projecting from one of its faces and which pin is adapted to be passed through a garment 12 and have a suitable knurled nut 13 threaded thereon to secure the casing to the garment. Rigidly secured in opposed relation to inner opposed faces of the casing 10 are clips 14, each consisting of a spring-like strip 15 having one end rigidly secured in the casing and the other end thereof free, the said free end of the strip having secured thereto a flat plate 16, a portion of which is cut away to provide a plurality of apertured ears 17. A roller 18 is mounted to turn freely on an arbor 19 having its ends terminating in apertured ears 20 through which transverse pins or screws 21 are passed and which also pass through the apertured lugs 17 to rigidly secure the arbor on the plate 16 so that the roller 18 can freely rotate in the cut away portion of the plate. It will be understood that each clip is the same and when clips are secured to the casing 10 they lie in opposed relation as shown.

A rule 22 similar to the ordinary pocket rule is adapted to be inserted in the upper end of the casing and it will be apparent that the opposed rollers 18 will engage the outer faces of the rule when the same passes therebetween so that the spring-like action produced by the strips 15 will hold the rollers against the face of the rule sufficiently to frictionally hold the rule in engagement with the rollers so that the rule will be supported within the casing and have its ends projecting therefrom so that it can be readily grasped and removed when it is desired to use the rule. By having the rollers 18 arranged to turn on the arbors 19, the rollers, operating over the surface of the rule, will not tend to mar or mutilate the graduations thereon, or the straight edges of the rule as would otherwise be the case if the rule were engaged with or slid over stationary gripping members or the spring-like strips 15 forming parts of the clips 14.

From the foregoing description it will be apparent that the rule holder described is of a simple construction, consists of few parts which cannot get out of order and can be cheaply manufactured.

The rule holder will be especially valuable to mechanics, such as painters, plumbers, gas fitters and carpenters, and although I have stated that the casing 10 is adapted to be applied to a garment, it will be understood that the same can also be secured to a wall or within a tool box.

Having thus described our invention, we claim:

In a rule holder, the combination with a casing adapted to receive the rule therein, said casing being open at both ends, of a plurality of opposed clips secured to the inner opposed faces of the casing and having their free ends for engagement with the rule to hold the same in the casing, said clips each consisting of a spring-like strip having one end rigidly secured in the casing, a flat plate on the other or free end of the strip, said plate having a cut away portion providing a plurality of ears, and a roller journaled on the ears and mounted to turn in the cut away portion of the plate whereby said roller, through the spring-like action of the strip will be held in sliding and frictional engagement with the rule when the same is inserted in the casing.

In testimony whereof we affix our signatures in presence of two witnesses.

ZALA RIDDLE.
NOWAL ASHBAUGH.

Witnesses:
W. G. EWING,
C. A. COTTER.

Copies of this patent may be obtained for five cents each, by addressing the "Commissioner of Patents, Washington, D. C."